United States Patent
De Grace et al.

(10) Patent No.: US 12,375,357 B2
(45) Date of Patent: Jul. 29, 2025

(54) RE-SIMULATION OF UPDATED SDN CONNECTION FLOWS

(71) Applicant: MICROSOFT TECHNOLOGY LICENSING, LLC, Redmond, WA (US)

(72) Inventors: Gerald Roy De Grace, Atlanta, GA (US); Deepak Bansal, Bellevue, WA (US); Rishabh Tewari, Sammamish, WA (US); Michal Czeslaw Zygmunt, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 426 days.

(21) Appl. No.: 17/855,730

(22) Filed: Jun. 30, 2022

(65) Prior Publication Data

US 2023/0370336 A1    Nov. 16, 2023

Related U.S. Application Data

(60) Provisional application No. 63/342,053, filed on May 13, 2022.

(51) Int. Cl.
*H04L 41/122* (2022.01)
*H04L 41/14* (2022.01)
*H04L 45/02* (2022.01)

(52) U.S. Cl.
CPC .......... *H04L 41/122* (2022.05); *H04L 41/145* (2013.01); *H04L 45/02* (2013.01)

(58) Field of Classification Search
CPC ..... H04L 41/122; H04L 41/145; H04L 45/02; H04L 41/0894
See application file for complete search history.

(56) References Cited

U.S. PATENT DOCUMENTS

| | | | |
|---|---|---|---|
| 8,989,199 B1 * | 3/2015 | Sella | H04L 45/745 370/395.31 |
| 9,960,956 B1 * | 5/2018 | Johnson | H04L 43/20 |

(Continued)

FOREIGN PATENT DOCUMENTS

WO    2016197004 A2    12/2016

OTHER PUBLICATIONS

"International Search Report and Written Opinion Issued in PCT Application No. PCT/US23/016474", Mailed Date: Jun. 16, 2023, 12 Pages.

*Primary Examiner* — Hoang-Chuong Q Vu
(74) *Attorney, Agent, or Firm* — Han Gim; Newport IP, LLC

(57) ABSTRACT

Data flows in a virtualized computing environment are efficiently updated by a hardware-based networking device configured to disaggregate processing of data packets of the data flows from hosts of the virtualized computing environment. A connection table is accessed that defines connection flows for data packets having a source from an endpoint in a virtual network of the virtualized computing environment or a destination to the endpoint in the virtual network of the virtualized computing environment. The hardware-based networking device re-simulates full packet processing paths for each of the flows in the connection table and updates the flows in the connection table to ensure that the flows in the connection table implement policies of the virtualized computing environment that were updated after corresponding flows in the connection table were added to the connection table.

20 Claims, 9 Drawing Sheets

(56) References Cited

U.S. PATENT DOCUMENTS

| | | | |
|---|---|---|---|
| 11,153,195 B1* | 10/2021 | Magerramov | H04L 45/306 |
| 2013/0325842 A1* | 12/2013 | Asai | G06F 16/80 |
| | | | 707/716 |
| 2015/0244617 A1* | 8/2015 | Nakil | H04L 43/20 |
| | | | 709/224 |
| 2015/0358288 A1* | 12/2015 | Jain | H04L 43/028 |
| | | | 709/224 |
| 2018/0097723 A1* | 4/2018 | Chinthalapati | H04L 45/38 |
| 2018/0241621 A1* | 8/2018 | Vaishnavi | H04L 41/342 |
| 2018/0287859 A1* | 10/2018 | Desigowda | H04L 41/342 |
| 2019/0007303 A1* | 1/2019 | Wackerly | H04L 41/20 |
| 2020/0067792 A1* | 2/2020 | Aktas | H04L 41/5009 |
| 2020/0336420 A1* | 10/2020 | Joshi | H04L 47/2433 |
| 2020/0358692 A1* | 11/2020 | Wang | H04L 45/54 |
| 2021/0127267 A1* | 4/2021 | Dilmaghani | H04L 41/0895 |
| 2022/0070140 A1* | 3/2022 | Goodwin | H04L 61/2528 |

* cited by examiner

RE-SIMULATION OF UPDATED SDN CONNECTION FLOWS

CROSS-REFERENCE TO RELATED APPLICATION

This non-provisional utility application claims priority to U.S. Patent Application Ser. No. 63/342,053 entitled "SIMULATION OF UPDATED SDN CONNECTION FLOWS" and filed on May 13, 2022, which is hereby incorporated in its entirety by reference.

BACKGROUND

A data center is a facility that houses computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

Many cloud architectures offload networking stack tasks to implement policies such as tunneling for virtual networks, security, and load balancing. By offloading packet processing tasks to hardware devices such as a network interface card (NIC) and/or a field programmable gate array (FPGA), the capacity of CPU cores can be reserved for running cloud services and reducing latency and variability to network performance.

New connections are typically evaluated against a number of rules before being allowed to be forwarded either as is or more frequently using some transformation using additional headers and/or changes to the original packet header content. Once a connection is evaluated, the connection may be offloaded to processing on a hardware device, in what may be referred to as the fast path. An offloaded connection may be an exact match on a predefined tuple of the packet header (Destination IP, Source IP, Destination Port, Source Port and Protocol Type) and does not require further evaluation for the connection duration unless the connection/flow is terminated.

The fast path connections may be referred to as being inserted into the "connection table". Entries and deletions from the connection table may be performed dynamically after evaluating the first packet of a connection or by looking for the connection to close. An entry for a connection includes the outgoing interface ID and also contains a pointer to a mapping table that has all of the information on how to transform the packet before it exits the DPU (SDN offload engine). For User Datagram Protocol (UDP) connections, the connection starts when the first UDP packet arrives and matches all SDN rules for "allow" and the connection is timed out after no packets have arrived over a programmable time limit.

Once a connection is established, the connection can remain active indefinitely in the connection table as long as either packets are received or a keep-alive is received before a timer expires. Connections can remain active indefinitely for TCP flows or UDP flows, where in the case of UDP only the detection of packets and timers may be used.

One issue that may arise is that a policy could change within the lifetime of a connection. If the connection table is not updated to reflect the changed policy, it is possible that connections that were formed previously formed will receive the wrong transformation, be forwarded to the wrong destination, or be forwarded when the connection should have been dis-allowed. Policies using rules or other techniques can change with the SDN policy, i.e., VNET Create, Update, or Delete operations and/or forwarding policy through a firewall set by the end user, etc.

The present disclosure provides a way to perform updates to the connection table using accelerator hardware devices. In an embodiment, the connection key, which includes the full tuple as its key, may be used to re-simulate the full packet processing path (i.e., the slow path) after a policy update. The re-simulation may be performed starting from the first connection in the table and upwards/downwards depending on which direction is desired. The same accelerator hardware that is used to process connections can now be used to re-process the connection and compare the stored hash to match the action and replace the action if necessary.

The described techniques can allow for maintaining efficient use of computing resources such as processor cycles, memory, network bandwidth, and power. This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

A network such as a software defined network (SDN) may include one or more devices that process inbound and outbound packet traffic, transform the packets such as by applying policies to the packets, and forward the packets. Such processes may include applying a packet processing graph which may comprise, for example, checking the content against a series of tables or other data structures, pattern matching against each table, and so forth.

When a new flow starts (e.g., a flow defined by the source and destination address of a data packet), the device may modify some rows in some tables of the processing graph to treat that flow with specified rules that are applicable for that flow (e.g., perform network address translation). Such a process may include, for example, capturing a data packet, identifying the packet as the first packet of a flow, placing the packet in a queue, sending the packet to a processor, parsing the packet, identifying an action, determining which tables to modify, locking the tables, applying the changes, and forwarding the packet. Such processing can consume significant computing resources such as CPU cycles, memory resources, as well as introducing latency which can result in delays and/or missing subsequent data packets in the flow.

One challenge is to be able to process new flows by executing the packet processing pipeline without significantly impacting the network throughput or latency. Many cloud architectures typically offload networking stack tasks to implement policies such as tunneling for virtual networks, security, and load balancing. By offloading packet processing tasks to hardware devices such as a network interface card (NIC) and a field programmable gate array (FPGA), the capacity of CPU cores can be reserved for running cloud services and reducing latency and variability to network performance.

Figure 4:
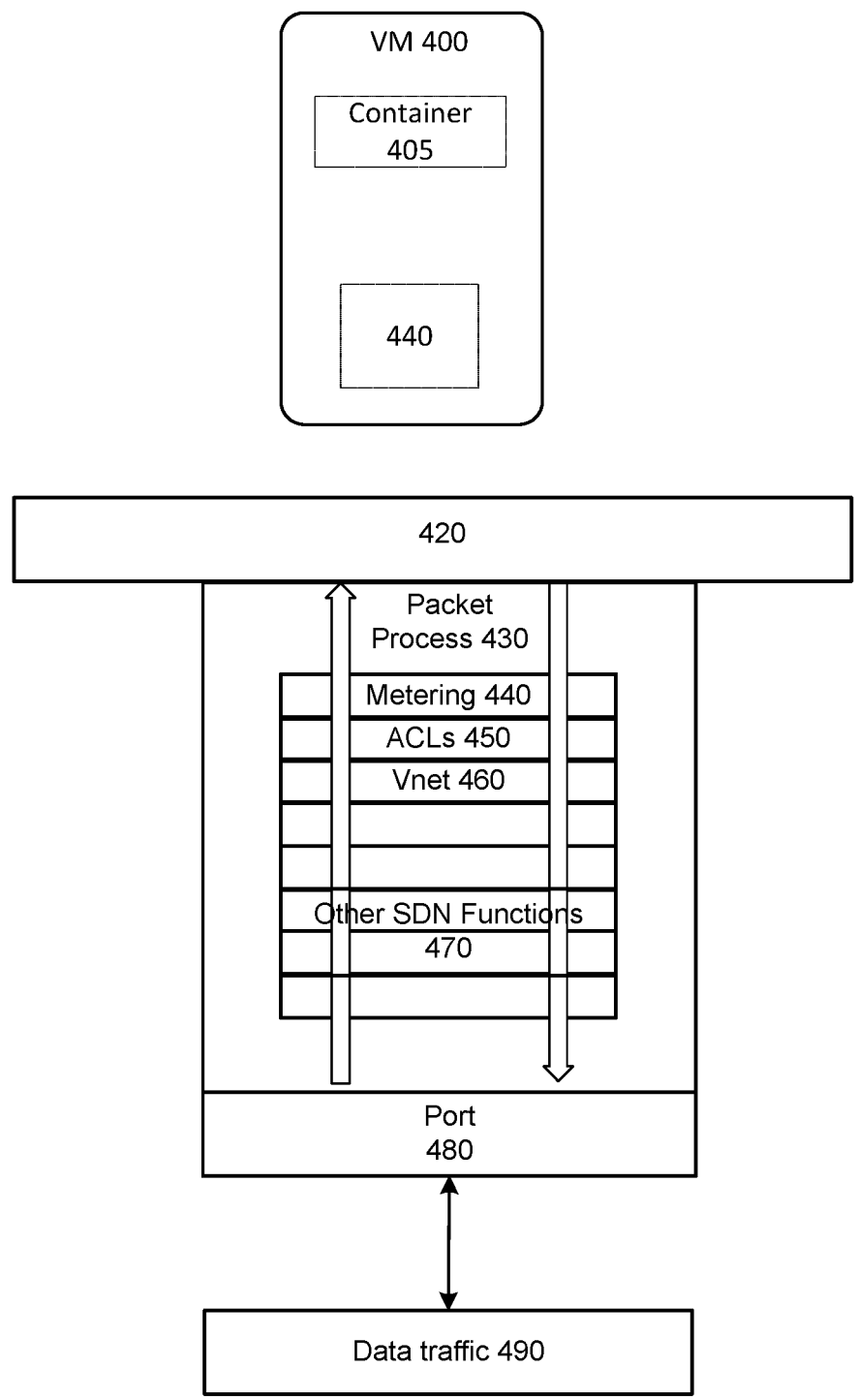
FIG. 4 is an example computing environment in accordance with the present disclosure.

In various network scenarios, a packet networking device may operate on packets received from the network by applying a sequence of rules to the packet. FIG. 4 shows an example packet processing extension 430 for a network device 420 that applies various operations on packets, such as specific networking policies that are tied to container 405. The network device 420 may logically underly the NIC 440 and may provide a port 480 for each VM supported by the NIC 440. The packet processing extension 430 may apply policies and transform or tunnel data packets in a given computing workload that are entering and leaving the VM 400. The packet processing extension 430 may include a central data packet processor (not shown) that performs the processing of data packets. The packet processing layers may include, in this example, those relating to metering 440, access control lists (ACLs) 450, VNet addressing/routing 460, and other various SDN functions or features 470 which may include, for example, those pertaining to routing, tunneling, filtering, address translation, encryption, decryption, encapsulation, de-encapsulation, quality of service (QoS), and the like. The packet processing function in the packet processing extension 430 may evaluate the packets of data traffic 490 as they traverse the networking policy layers, matching rules in each layer based on a state of the packet after an action is performed in the preceding layer. Returning packets may traverse the layers in the opposite direction and may be processed by the packet processing extension 430 to match the applicable rules. The rules used to express the networking policies may be entities that perform actions on matching packets (e. g., using a match action table model) as the computing workload is processed by the packet processing extension 430.

In some examples, packet processing rules may be expressed in tables where the device examines specific bits within the packet and compares the values of those bits with the keys stored in the various rows in the table. The table rows may also contain actions to perform on packets that match against them and may indicate a subsequent table of rules to check. Different packets in general may visit a different sequence of tables. The collection of tables and the links between them may be referred to as the packet processing graph or a generic flow table (GFT).

In some implementations, such as in a device with a hardware data plane, the graph may be fixed by the network processing units (NPUs) and packets may be processed through the graph by the NPUs without involvement by the device's central processing units (CPUs). This may provide one way to route packets quickly by using specialized hardware designed and optimized only for this purpose. However, in a device with a software data plane, packets may be processed through the graph by threads running on one or more of the device's CPUs which are dedicated to this purpose. These may be referred to as the packet processing pipeline threads.

In some implementations, the first packet in a flow may be identified and the first packet may be removed from the software or hardware-based pipeline to be handled by a separate control thread on another CPU. A flow may be a set of related packets, for example all TCP packets sent between a specific pair of IP addresses and ports, which tend to need the same actions to be performed on them. The control thread analyzes the packet, constructs the changes required to the graph, and applies those changes to the graph. The control thread analyzes the packet's properties and which part of the graph intercepted it. The control thread then creates a new part of the graph and waits for a lock on the graph to impose the changes.

Hardware-based network devices may perform processing of data flows including the initial identification of data flows, porting information, and applicable policies. Thus, the hardware-based network device can identify the first packet of a new data flow, maintain cache states for the new data flow, apply applicable policies for the data flow, process subsequent packets in the new data flow, and terminate application of the policies in the flow tables when the data flow is complete. The network device can perform these functions without the need to invoke software-based processing, causing undue delay and thus avoiding latency, possible packet loss, and limitations on new connections. Connections are thus evaluated against a number of rules before being allowed to be forwarded either as is or more frequently using some transformation using additional headers and/or changes to the original packet header content.

Once a connection is evaluated, a connection may be moved to what may be referred to as the fast path, as discussed above. It is called this as it becomes an exact match on a predefined tuple of the packet header (Destination IP, Source IP, Destination Port, Source Port and Protocol Type), and does not require further evaluation for the flows duration unless the connection/flow is terminated. The fast path connections may be referred to as being inserted into the "Connection Table".

Entries and deletions from the connection table may be performed dynamically after evaluating the first packet of a connection or by looking for the connection close. For UDP the so-called connection starts when the first UDP packet arrives and matches all the SDN rules for "allow" and then is simply timed out after no packets have arrived after a programmable time limit. The entry of a connection holds the outgoing interface ID and also contains a pointer to the mapping table that has all of the information on how to transform the packet before it exits the DPU (SDN offload engine). Once a connection is established, the connection can remain in place indefinitely as long as either as packets are received or keep-alive is received before an aging timer. This is equally true for connections for TCP or flows for UDP. In the case of UDP, only the detection of packets and aging timers may be used.

One problem that may arise is that an SDN policy that allows for the fast path entry may change within the lifetime of a connection. If the connection table is not updated accordingly, it is possible that connections that were formed will receive the wrong transformation, be forwarded to the wrong destination, or in fact be forwarded when the connection should have been dis-allowed. Policy changes may include any change to rules, forwarding tables, mappings, or any other processing agent that may affect the admission of packets or the outgoing interface and transformational mappings. Policy using rules or other techniques can change with the SDN policy i.e., VNET Create, Update, Delete operations and/or forwarding policy through a firewall set by the end use, and the like.

Figure 1:
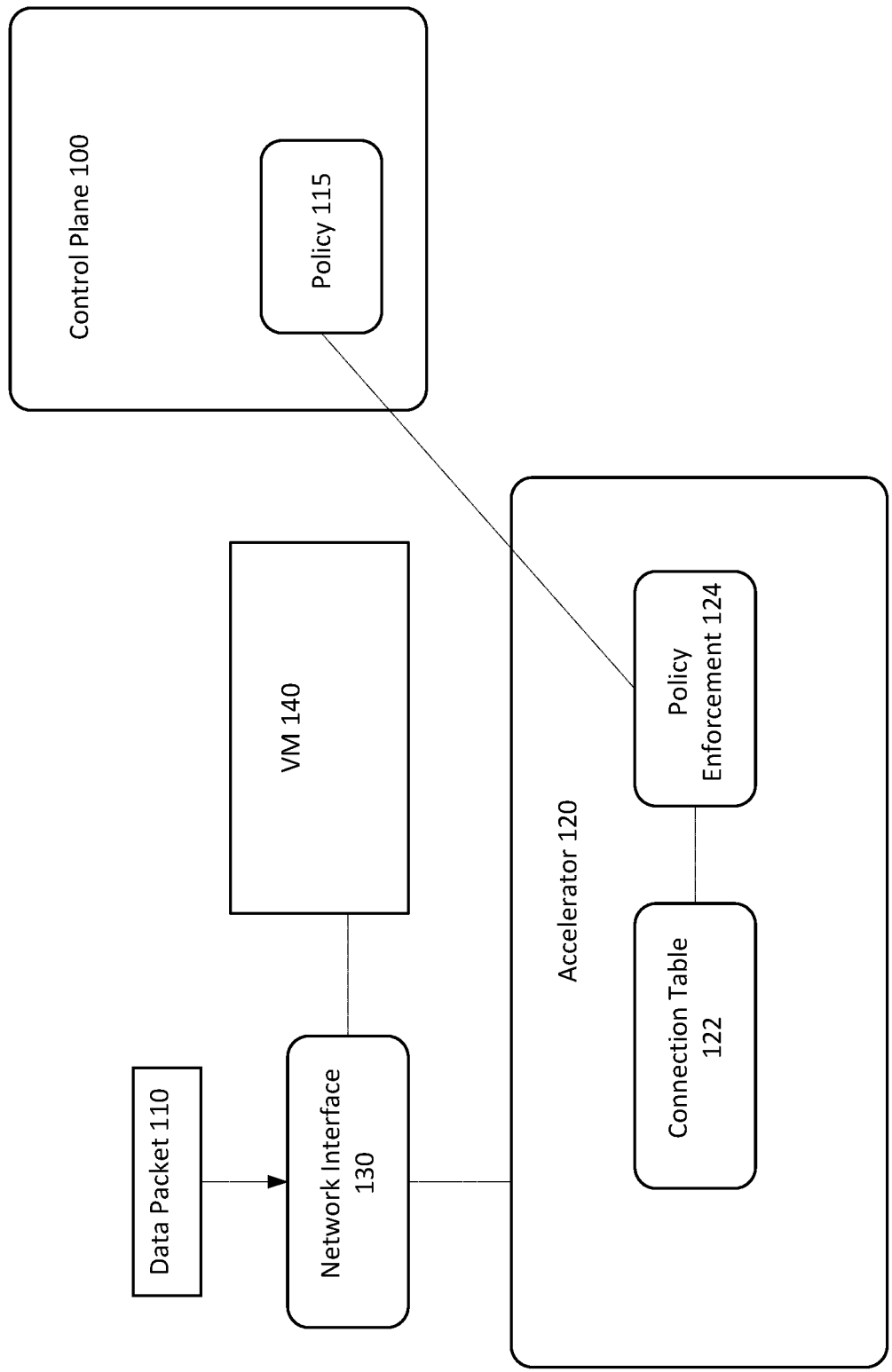
FIG. 1 is a diagram illustrating an example architecture in accordance with the present disclosure.

For example, in reference to FIG. 1, In some implementations, the first packet in a flow may be identified and the first packet may be removed from the software or hardware-based pipeline to be handled by a separate control thread on another CPU. Hardware-based network devices may perform processing of data flows including the initial identification of data flows, porting information, and applicable policies. Thus, the hardware-based network device can identify the first packet of a new data flow, maintain cache states for the new data flow, apply applicable policies for the data flow, process subsequent packets in the new data flow, and terminate application of the policies in the flow tables when the data flow is complete. Once a connection is evaluated, a connection may be moved to what may be referred to as the fast path, as discussed above. Once a connection is evaluated, a connection may be moved to what may be referred to as the fast path, as discussed above. It is called this as it becomes an exact match on a predefined tuple of the packet header (Destination IP, Source IP, Destination Port, Source Port and Protocol Type), and does not require further evaluation for the flows duration unless the connection/flow is terminated. The fast path connections may be referred to as being inserted into the "Connection Table". One problem that may arise is that an SDN policy that allows for the fast path entry may change within the lifetime of a connection. Systems and methods are described herein for performing updates to the connection table using acceleration hardware.

Systems and methods are described herein for performing updates to the connection table using acceleration hardware. As used herein, a connection key may be defined by the full tuple for a connection (Destination IP, Source IP, Destination Port, Source Port, Protocol ID) or a compressed ID representing the same. Using the connection key to identify a connection, the slow path can be re-simulated after a policy update starting from the first connection in the table and upwards/downwards through the table depending on which direction is desired. The same acceleration hardware that is used to process offloaded connections can now be used to re-process the connections. A stored hash can be compared to a matched action and replaced if necessary.

For example, with reference to FIG. 1, a packet 110 in a flow may be received via a network interface 130. The packet 110 may be identified and sent to a hardware-based accelerator device 120 that is configured to perform processing of data flows in the fast path, as discussed above. The fast path connections may be inserted into a connection table 122. The hardware-based accelerator device 120 may apply applicable policies 124 for the data flow associated with the data packet 110 and terminate application of the policies when the data flow is complete. Policy enforcement 124 may be applied for SDN policies 115 that are received, for example, from the SDN control plane 100.

Re-simulation of flows may be performed after receiving a set of policy updates which is signaled by the SDN control plane 100. By doing so, the SDN control plane 100 can determine exactly when the re-simulation should commence and at the same time based on the information in the policy table, forwarding table, and mappings table are fully coherent and not partially completed. The SDN control plane 100 may also decide to send multiple groupings of updates that would have the re-simulation performed multiple times at appropriate points that ensure coherent updates while not waiting too long to re-simulate the connection table 122.

In various embodiments, as the connection table 122 is processed by re-simulating each connection entry of the connection table 122 with the current SDN rules, forwarding, and mappings, in due course all connections in the connection table 122 will be updated and correctly forwarded with the correct SDN operation, and in some cases a connection may be removed. By continuously performing the update procedure progressively through each entry in the connection table 122, within some time period comprising the processing time for updating the entire table, it can be ensured that all connections in the connection table 122 will be updated with any applicable updates or removed if appropriate. In some embodiments, the SDN control plane 100 may send updates in batches causing the re-simulation to be repeated several times. However, on each run through the connection table 122, the connections will be coherent for the updates provided by the SDN control plane 100 and should not result in a partial update.

Further disclosed herein are methods for an efficient way to update connections by adding a connection identifier as each connection is created. When traversing the connection table 122, the accelerator hardware may first determine if the connection identifier is still present in the connection table 122. If the connection identifier is still present in the connection table 122, a re-simulation is not necessary for that connection and therefore the re-simulation process can immediately move on to the next connection. Depending on the expected rate at which connections are updated through re-simulation, the re-simulation process may be performed as the connection table is aged for a given time period as a further optimization. The specific implementation details of the re-simulation process may be selected to provide the best re-simulation optimization based on the capabilities of the acceleration device.

Depending on the expected rate at which connections are updated, in one embodiment, the simulation process may be paused once the connection table is updated, and no more policy updates have arrived during the previous table update. If any policy is changed during the table update, the entire table may be re-simulated. In an embodiment, the table update can be dampened for a period of time to limit how many times the table requires re-simulation when updates may arrive in batches. The dampening time period may be selected so as to allow the re-simulation to occur as quickly as possible within reasonable times without substantially reducing normal connection operation processing.

If an entry in the connection table is updated with a new SDN operation, then any meters associated with a connection may be extracted and reset to ensure the proper operation of higher-level software functions who rely on the information.

The time required to traverse and update the connection table will mean that changes at the SDN control layer are not performed instantaneously. If this function is offloaded to the hardware acceleration device, the entire table can be updated in a short period of time compared to other methods. This processing times may typically be such that there is little noticeable effect on users. During the transition and even after new SDN policies are programmed, all connections will be processed according to the "current content" of the connection table. Over a short period of time, the connections will be updated and the new forwarding/transformations will take effect unless the action was to remove the entry all together. If the action was to remove the entry, then the TCP or UDP end points will time out the connections as per their normal operations.

Figure 2A:
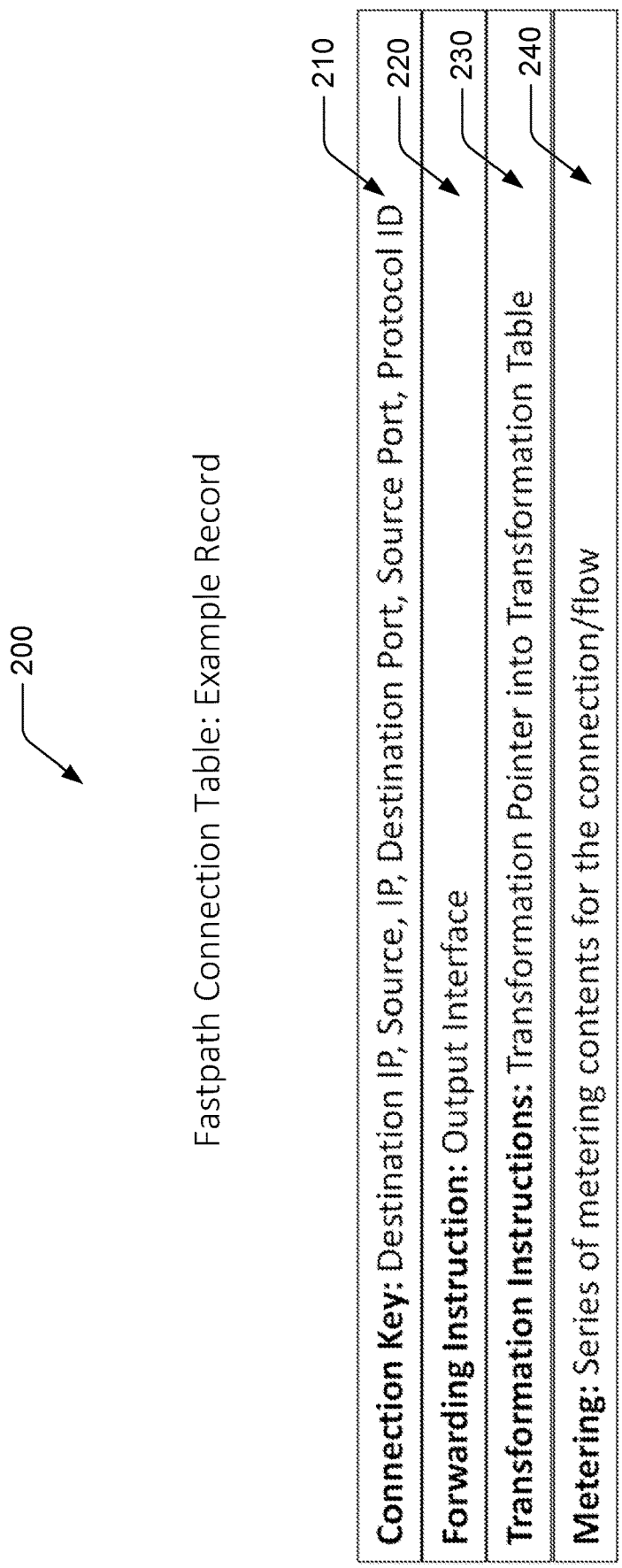
FIG. 2A is an example table in accordance with the present disclosure.

FIG. 2A illustrates an example record of a fast path connection table 200. Connection table 200 illustrates an entry for a connection key 210 that includes a Destination IP, Source IP, Destination Port, Source Port, and Protocol ID. Forwarding Instruction 220 may include, for example, an Output Interface that may indicate where the packet needs to go, such as identify an interface at a network interface card (NIC). Transformation Instructions 230 may include a Transformation Pointer into the Transformation Table. The instructions may indicate the transformations identified for packets in the flow such as applying a tunnel on it, changes of source or destination addresses, new filters, etc. Metering 240 may include a series of metering contents for the connection/flow. Metering may allow for charging based on usage, for example.

The Connection Key 210 may be a constant for the duration of the record. The Forwarding Instruction 220 output interface can be updated by the SDN control plane via re-simulation. Transformation Instructions 230 can be updated by the SDN control plane via-re-simulation. Metering 240 may be valid while the record is constant or aggregated and sent upwards if the record is changed.

Figure 2B:
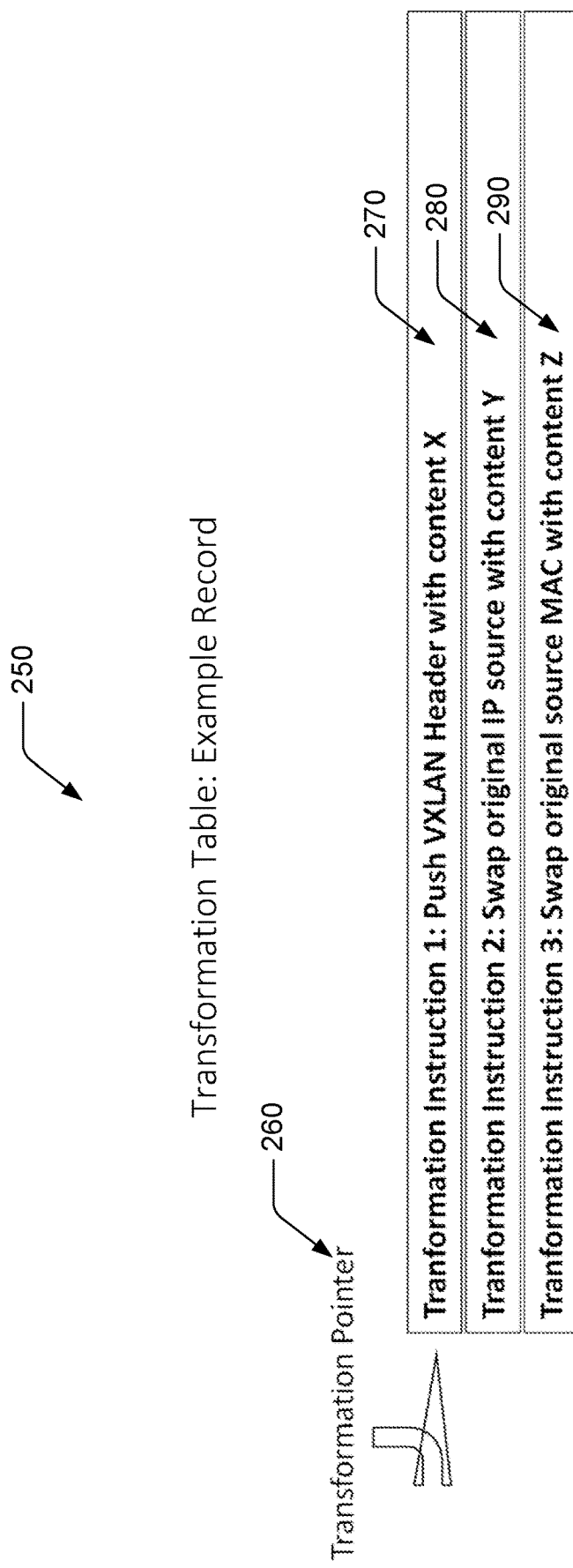
FIG. 2B is an example table in accordance with the present disclosure.

FIG. 2B illustrates an example record 250 of a transformation table. Example record 250 illustrates an entry for a Transformation Instruction 1 270 that includes "Push VXLAN Header with content X." Example record 250 illustrates an entry for a Transformation Instruction 2 280 that includes "Swap original IP source with content Y." Example record 250 illustrates an entry for a Transformation Instruction 3 290 that includes "Swap original source MAC with content Z." Example record 250 may by indicated by a transformation pointer 260 that points to a the record.

The example record 250 can contain any number of transformation instructions. The example record 250 can contain a static replacement of the IP header and outer tunnel header if required. The example record 250 can contain step by step instructions on which fields to manipulate, swap, or replace.

The example record 250 can contain instructions to manipulate original packet and a number of tunnel headers. The example record 250 can contain instructions for IPv4, IPv6 and/or transformations between. Mappings may be shared by many connections or may be unique to a single connection. The transformation instructions generally define transformations to be applied a packet before the packet exits. The fast path connection table 200 may have pointers to the transformation table.

Figure 3:
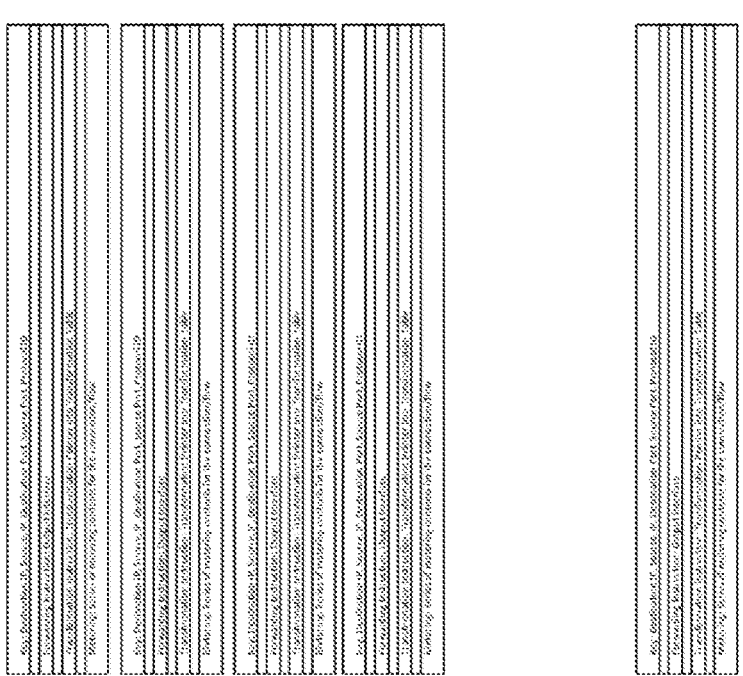
FIG. 3 is an example table in accordance with the present disclosure.

FIG. 3 illustrates an example of a fast path connection table 300. Table 300 illustrates that the table may include a plurality of dynamically created "Fastpath Connection Records." In an embodiment, the table connection reference key may be the corresponding connections tuple. The connection tuple, according to one implementation, may be (DST IP, SRC IP, DST Port, SRC Port, Port ID).

Figure 5:
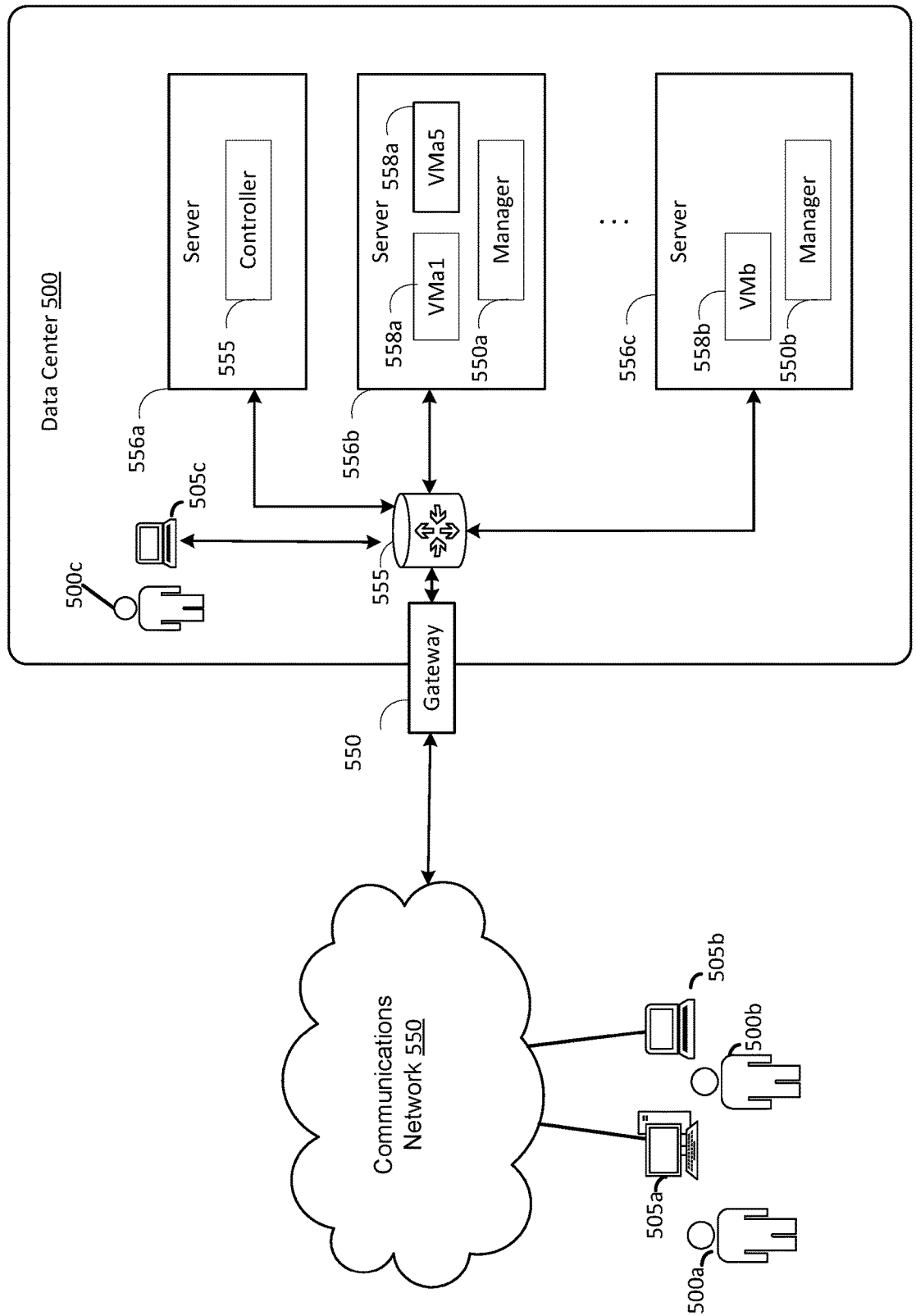
FIG. 5 is an example computing environment in accordance with the present disclosure.

FIG. 5 illustrates an example computing environment in which the embodiments described herein may be implemented. FIG. 5 illustrates a data center 500 that is configured to provide computing resources to users 500a, 500b, or 500c (which may be referred herein singularly as "a user 500" or in the plural as "the users 500") via user computers 505a, 505b, and 505c (which may be referred herein singularly as "a computer 505" or in the plural as "the computers 505") via a communications network 550. The computing resources provided by the data center 500 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 500 may correspond to data center 100 and 110 of FIG. 5. Data center 500 may include servers 556a, 556b, and 556c (which may be referred to herein singularly as "a server 556" or in the plural as "the servers 556") that may be standalone or installed in server racks, and provide computing resources available as virtual machines 558a and 558b (which may be referred to herein singularly as "a virtual machine 558" or in the plural as "the virtual machines 558"). The virtual machines 558 may be configured to execute applications such as Web servers, application servers, media servers, database servers, and the like. Other resources that may be provided include data storage resources (not shown on FIG. 5) and may include file storage devices, block storage devices, and the like. Servers 556 may also execute functions that manage and control allocation of resources in the data center, such as a controller 555. Controller 555 may be a fabric controller or another type of program configured to manage the allocation of virtual machines on servers 556.

Referring to FIG. 5, communications network 550 may, for example, be a publicly accessible network of linked networks and may be operated by various entities, such as the Internet. In other embodiments, communications network 550 may be a private network, such as a corporate network that is wholly or partially inaccessible to the public.

Communications network 550 may provide access to computers 505. Computers 505 may be computers utilized by users 500. Computer 505a, 505b or 505c may be a server, a desktop or laptop personal computer, a tablet computer, a smartphone, a set-top box, or any other computing device capable of accessing data center 500. User computer 505a or 505b may connect directly to the Internet (e.g., via a cable modem). User computer 505c may be internal to the data center 500 and may connect directly to the resources in the data center 500 via internal networks. Although only three user computers 505a, 505b, and 505c are depicted, it should be appreciated that there may be multiple user computers.

Computers 505 may also be utilized to configure aspects of the computing resources provided by data center 500. For example, data center 500 may provide a Web interface through which aspects of its operation may be configured through the use of a Web browser application program executing on user computer 505. Alternatively, a stand-alone application program executing on user computer 505 may be used to access an application programming interface (API) exposed by data center 500 for performing the configuration operations.

Servers 556 may be configured to provide the computing resources described above. One or more of the servers 556 may be configured to execute a manager 550a or 550b (which may be referred herein singularly as "a manager 550" or in the plural as "the managers 550") configured to execute the virtual machines. The managers 550 may be a virtual machine monitor (VMM), fabric controller, or another type of program configured to enable the execution of virtual machines 558 on servers 556, for example.

It should be appreciated that although the embodiments disclosed above are discussed in the context of virtual machines, other types of implementations can be utilized with the concepts and technologies disclosed herein.

In the example data center 500 shown in FIG. 5, a network device 555 may be utilized to interconnect the servers 556a and 556b. Network device 555 may comprise one or more switches, routers, or other network devices. Network device 555 may also be connected to gateway 550, which is connected to communications network 550. Network device 555 may facilitate communications within networks in data center 500, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 500 described in FIG. 5 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 6A:
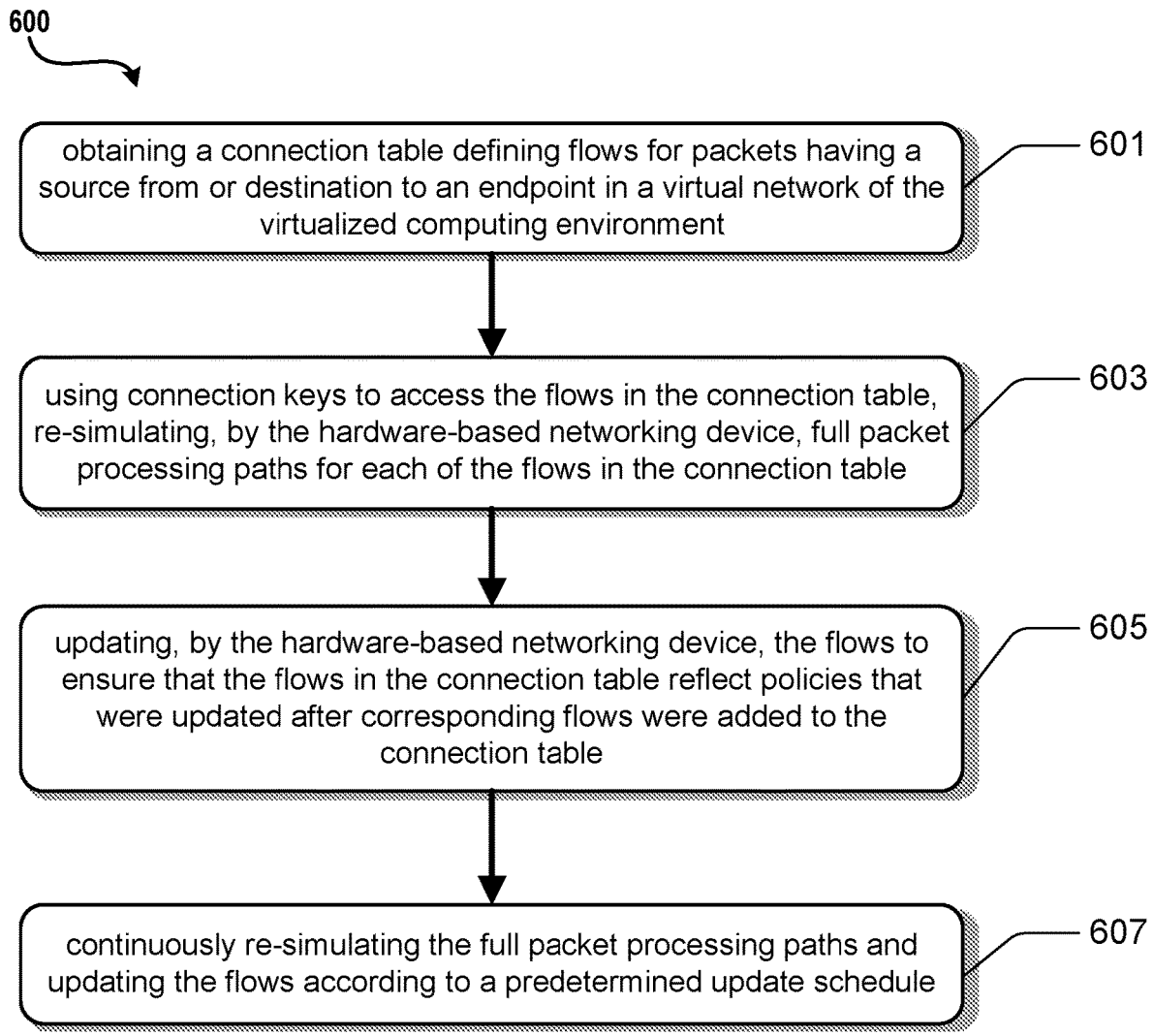
FIG. 6A is a flowchart depicting an example procedure in accordance with the present disclosure.

Turning now to FIG. 6A, illustrated is an example operational procedure for processing data packets in a virtualized computing environment by a hardware-based networking device configured to disaggregate processing of data packets from hosts of the virtualized computing environment in accordance with the present disclosure. Such an operational procedure can be provided by one or more components illustrated in FIGS. 1-5 and 7. The operational procedure may be implemented by a hardware-based networking device configured to disaggregate processing of data packets from hosts of the virtualized computing environment. In an embodiment, the hardware-based networking device comprises a hardware-based component implementing a plurality of behavioral models indicative of packet processing graphs for data flows in the virtualized computing environment. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 600 is described as running on a system, it can be appreciated that the routine 600 and other operations described herein can be executed on an individual computing device or several devices.

Referring to FIG. 6A, operation 601 illustrates obtaining, by the hardware-based networking device, a connection table defining flows for packets having a source from or destination to an endpoint in a virtual network of the virtualized computing environment.

Operation 601 may be followed by operation 603. Operation 603 illustrates using connection keys to access the flows in the connection table, and re-simulating, by the hardware-based networking device, full packet processing paths for each of the flows in the connection table.

Operation 603 may be followed by operation 605. Operation 605 illustrates updating, by the hardware-based networking device, the flows to ensure that the flows in the connection table reflect policies that were updated after corresponding flows were added to the connection table.

Operation 605 may be followed by operation 607. Operation 607 illustrates continuously re-simulating the full packet processing paths and updating the flows according to a predetermined update schedule.

Figure 6B:
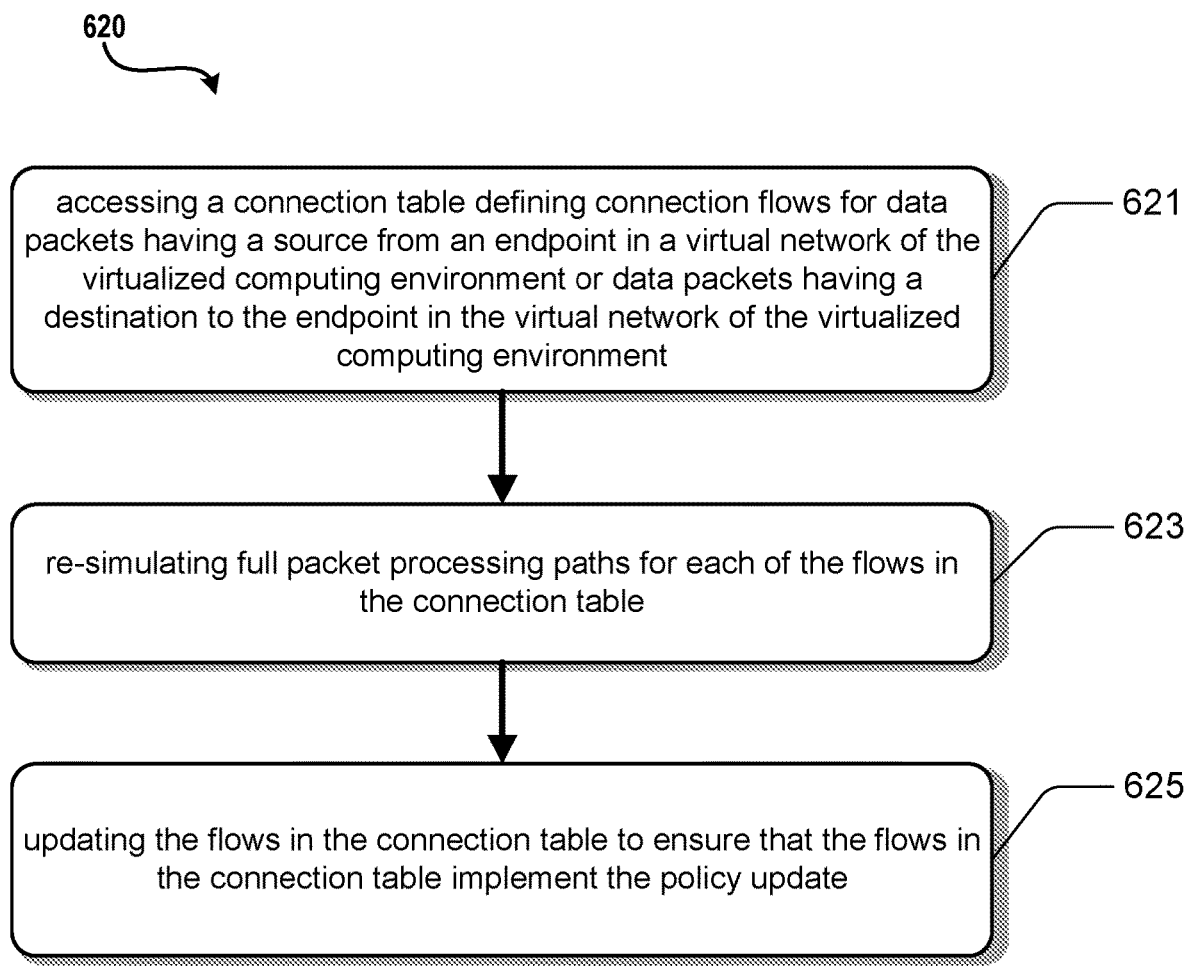
FIG. 6B is a flowchart depicting an example procedure in accordance with the present disclosure.

Turning now to FIG. 6B, illustrated is an example operational procedure for processing data packets in a virtualized computing environment by a hardware-based networking device configured to disaggregate processing of data packets from hosts of the virtualized computing environment in accordance with the present disclosure.

Referring to FIG. 6B, operation 621 illustrates in response to an indication of a policy update in the virtualized computing environment, accessing, by the hardware-based networking device, a connection table defining connection flows for data packets having a source from an endpoint in a virtual network of the virtualized computing environment or data packets having a destination to the endpoint in the virtual network of the virtualized computing environment.

Operation 621 may be followed by operation 623. Operation 623 illustrates re-simulating, by the hardware-based networking device, full packet processing paths for each of the flows in the connection table.

Operation 623 may be followed by operation 625. Operation 625 illustrates based on the re-simulating, updating, by the hardware-based networking device, the flows in the connection table to ensure that the flows in the connection table implement the policy update.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
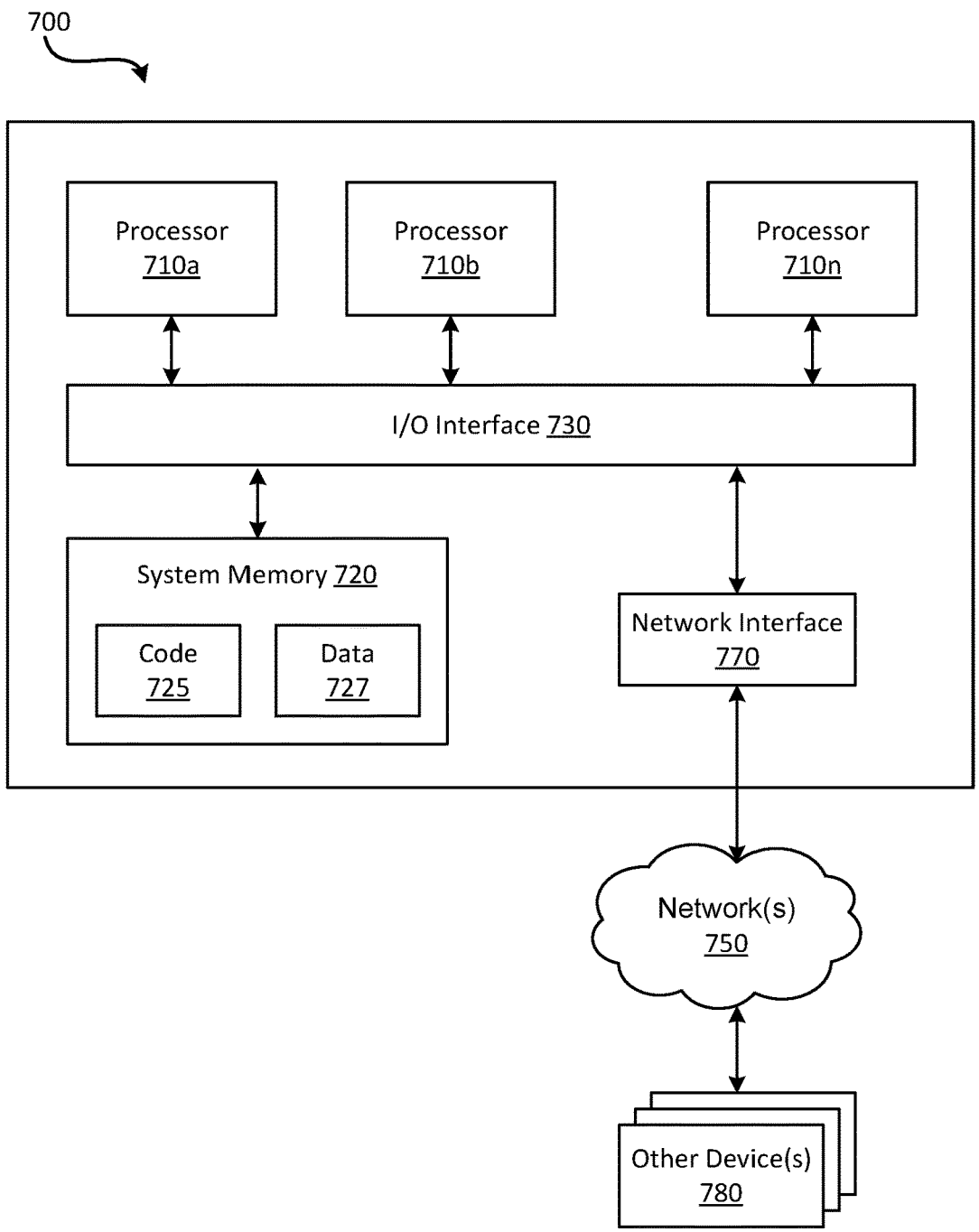
FIG. 7 is an example computing device in accordance with the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 77 via an input/output (I/O) interface 730. Computing device 700 further includes a network interface 770 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x87, PowerPC, SPARC, or MIPS ISAs, or any other suitable ISA. In multiprocessor systems, each of processors 710 may commonly, but not necessarily, implement the same ISA.

System memory 77 may be configured to store instructions and data accessible by processor(s) 710. In various embodiments, system memory 77 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 77, and any peripheral devices in the device, including network interface 770 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 770 may be configured to allow data to be exchanged between computing device 700 and other device or devices 770 attached to a network or network(s) 730, such as other computer systems or devices as illustrated in FIGS. 1 through 5, for example. In various embodiments, network interface 770 may support communication via any suitable wired or wireless general data networks, such as types of Ethernet networks, for example. Additionally, network interface 770 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-3 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 770. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 4, or may utilize an architecture completely different than that shown in FIG. 4.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing data flows in a virtualized computing environment by a hardware-based networking device configured to disaggregate processing of data packets of the data flows from hosts of the virtualized computing environment, the method comprising:
  in response to an indication of a policy update in the virtualized computing environment, accessing, by the hardware-based networking device, a connection table defining connection flows for data packets having a source from an endpoint in a virtual network of the virtualized computing environment or data packets having a destination to the endpoint in the virtual network of the virtualized computing environment;
  re-simulating, by the hardware-based networking device, full packet processing paths for each of the flows in the connection table; and
  based on the re-simulating, updating, by the hardware-based networking device, the flows in the connection table to ensure that the flows in the connection table implement the policy update.

Clause 2: The method of clause 1, further comprising the flows in the connection table to ensure that the flows in the connection table implement other policies that were updated after flows affected by the other policies that were updated.

Clause 3: The method of any of clauses 1-2, further comprising continuously re-simulating and updating the full packet processing paths for the flows in the connection table according to a predetermined update schedule.

Clause 4: The method of any of clauses 1-3, further comprising using connection keys to access individual flows in the connection table.

Clause 5: The method of any of clauses 1-4, further comprising adding a connection identifier in the connection table as connections are created.

Clause 6: The method of any of clauses 1-5, wherein the re-simulating comprises:
  determining if the connection identifier is present in the connection table; and
  performing the re-simulating in response to determining that the connection identifier is not present.

Clause 7: The method of clauses 1-6, wherein the connection keys comprise a tuple for a corresponding connection.

Clause 8: The method of any of clauses 1-7, wherein the tuple comprises Destination IP, Source IP, Destination Port, Source Port, Protocol ID or a compressed ID representing the Destination IP, Source IP, Destination Port, Source Port, Protocol ID.

Clause 9: The method of any of clauses 1-8, wherein the re-simulating comprises comparing a stored hash to an action to determine a match.

Clause 10: The method of any of clauses 1-9, wherein the policy update comprises one or more of an update to a forwarding table, rules table, or mappings table.

Clause 11: A hardware-based networking device configured to disaggregate processing of data packets from hosts of a virtualized computing environment, the hardware-based networking device comprising a hardware-based component implementing packet processing graphs for data flows in the virtualized computing environment, the hardware-based networking device configured to perform operations comprising:
  in response to an indication of a policy update in the virtualized computing environment, accessing a connection table defining connection flows for data packets having a source from an endpoint in a virtual network of the virtualized computing environment or data packets having a destination to the endpoint in the virtual network of the virtualized computing environment;
  re-simulating full packet processing paths for each of the flows in the connection table; and
  based on the re-simulating, updating, the flows in the connection table to ensure that the flows in the connection table implement the policy update.

Clause 12: The hardware-based networking device of clause 11, further configured to perform operations comprising:
  adding a connection identifier in the connection table as connections are created.

Clause 13: The hardware-based networking device of any of clauses 11 and 12, wherein the re-simulating comprises:
  determining if the connection identifier is present in the connection table; and
  performing the re-simulating in response to determining that the connection identifier is not present.

Clause 14: The hardware-based networking device of any clauses 11-13, further configured to perform operations comprising using connection keys to access individual flows in the connection table, wherein the connection keys comprise a tuple for a corresponding connection.

Clause 15: The hardware-based networking device of any clauses 11-14, wherein the re-simulating comprises comparing a stored hash to action to determine a match.

Clause 16: The hardware-based networking device of any clauses 11-15, further configured to perform operations comprising continuously re-simulating and updating the full packet processing paths for the flows in the connection table according to a predetermined update schedule.

Clause 17: A computing system comprising a plurality of computing devices and one or more hardware-based networking devices configured to disaggregate processing of data packets from the plurality of computing devices, the hardware-based networking device comprising a hardware-based component implementing a plurality of packet processing graphs for data flows in the computing system, the hardware-based networking device configured to perform operations comprising:

in response to an indication of a policy update in the computing system, obtaining a connection table defining flows for packets having a source from or destination to an endpoint in a virtual network of the virtualized computing environment;

using connection keys to access the flows in the connection table;

re-simulating, by the hardware-based networking device, full packet processing paths for each of the flows in the connection table; and updating, by the hardware-based networking device, the flows to ensure that the flows in the connection table reflect policies that were updated after corresponding flows were added to the connection table.

Clause 18: The computing system of clause 17, the hardware-based networking device further configured to perform operations comprising:

adding a connection identifier in the connection table as connections are created.

Clause 19: The computing system of any of clauses 17 and 18, wherein the re-simulating comprises:

determining if the connection identifier is present in the connection table; and performing the re-simulating in response to determining that the connection identifier is not present.

Clause 20: The computing system of any of the clauses 17-19, wherein the connection keys comprise a tuple for a corresponding connection.

The invention claimed is:

1. A method for managing data flows in a virtualized computing environment by a hardware-based networking device configured to disaggregate processing of data packets of the data flows from hosts of the virtualized computing environment, the method comprising:

in response to an indication of a policy update in the virtualized computing environment, accessing, by the hardware-based networking device, a connection table defining connection flows for data packets having a source from an endpoint in a virtual network of the virtualized computing environment or data packets having a destination to the endpoint in the virtual network of the virtualized computing environment, wherein the connection flows in the connection table comprise fast path connections based on full packet processing of corresponding connection flows;

re-simulating, by the hardware-based networking device, full packet processing paths for each of the fast path connections in the connection table; and based on the re-simulating, updating, by the hardware-based networking device, the fast path connections in the connection table to ensure that the fast path connections in the connection table implement the policy update.

2. The method of claim 1, further comprising the fast path connections in the connection table to ensure that the fast path connections in the connection table implement other policies that were updated after fast path connections affected by the other policies that were updated.

3. The method of claim 1, further comprising continuously re-simulating and updating the full packet processing paths for the fast path connections in the connection table according to a predetermined update schedule.

4. The method of claim 1, further comprising using connection keys to access individual fast path connections in the connection table.

5. The method of claim 4, wherein the connection keys comprise a tuple for a corresponding connection.

6. The method of claim 5, wherein the tuple comprises Destination IP, Source IP, Destination Port, Source Port, Protocol ID or a compressed ID representing the Destination IP, Source IP, Destination Port, Source Port, Protocol ID.

7. The method of claim 1, further comprising adding a connection identifier in the connection table as connections are created.

8. The method of claim 7, wherein the re-simulating comprises:

determining if the connection identifier is present in the connection table; and performing the re-simulating in response to determining that the connection identifier is not present.

9. The method of claim 1, wherein the re-simulating comprises comparing a stored hash to an action to determine a match.

10. The method of claim 1, wherein the policy update comprises one or more of an update to a forwarding table, rules table, or mappings table.

11. A hardware-based networking device configured to disaggregate processing of data packets from hosts of a virtualized computing environment, the hardware-based networking device comprising a hardware-based component implementing packet processing graphs for data flows in the virtualized computing environment, the hardware-based networking device configured to perform operations comprising:

in response to an indication of a policy update in the virtualized computing environment, accessing a connection table defining connection flows for data packets having a source from an endpoint in a virtual network of the virtualized computing environment or data packets having a destination to the endpoint in the virtual network of the virtualized computing environment, wherein the connection flows in the connection table comprise fast path connections based on full packet processing of corresponding connection flows;

re-simulating full packet processing paths for each of the fast path connections in the connection table; and based on the re-simulating, updating, the fast path connections in the connection table to ensure that the fast path connections in the connection table implement the policy update.

12. The hardware-based networking device of claim 11, further configured to perform operations comprising:

adding a connection identifier in the connection table as connections are created.

13. The hardware-based networking device of claim 12, wherein the re-simulating comprises:
   determining if the connection identifier is present in the connection table; and
   performing the re-simulating in response to determining that the connection identifier is not present.

14. The hardware-based networking device of claim 11, further configured to perform operations comprising using connection keys to access individual flows in the connection table, wherein the connection keys comprise a tuple for a corresponding connection.

15. The hardware-based networking device of claim 11, wherein the re-simulating comprises comparing a stored hash to action to determine a match.

16. The hardware-based networking device of claim 11, further configured to perform operations comprising continuously re-simulating and updating the full packet processing paths for the fast path connections in the connection table according to a predetermined update schedule.

17. A computing system comprising a plurality of computing devices and a hardware-based networking device configured to disaggregate processing of data packets from the plurality of computing devices, the hardware-based networking device comprising a hardware-based component implementing a plurality of packet processing graphs for data flows in the computing system, the hardware-based networking device configured to perform operations comprising:
   in response to an indication of a policy update in the computing system, obtaining a connection table defining flows for packets having a source from or destination to an endpoint in a virtual network of the virtualized computing environment, wherein the connection flows in the connection table comprise fast path connections based on full packet processing of corresponding connection flows;
   using connection keys to access the fast path connections in the connection table;
   re-simulating, by the hardware-based networking device, full packet processing paths for each of the fast path connections in the connection table; and
   updating, by the hardware-based networking device, the fast path connections to ensure that the fast path connections in the connection table reflect policies that were updated after corresponding fast path connections were added to the connection table.

18. The computing system of claim 17, the hardware-based networking device further configured to perform operations comprising:
   adding a connection identifier in the connection table as connections are created.

19. The computing system of claim 18, wherein the re-simulating comprises:
   determining if the connection identifier is present in the connection table; and
   performing the re-simulating in response to determining that the connection identifier is not present.

20. The computing system of claim 17, wherein the connection keys comprise a tuple for a corresponding connection.

* * * * *